(12) United States Patent
Nishi

(10) Patent No.: US 8,064,466 B2
(45) Date of Patent: Nov. 22, 2011

(54) METHOD FOR SPECIFYING INPUT EDGE ROUTER

(75) Inventor: Tetsuya Nishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 286 days.

(21) Appl. No.: 12/576,393

(22) Filed: Oct. 9, 2009

(65) Prior Publication Data

US 2010/0124177 A1    May 20, 2010

(30) Foreign Application Priority Data

Nov. 20, 2008  (JP) ................................. 2008-296233

(51) Int. Cl.
*H04L 12/28* (2006.01)
(52) U.S. Cl. ...................................................... 370/400
(58) Field of Classification Search .................. 370/229, 370/241, 252, 253, 351, 389, 390, 400; 709/223–226, 238, 249
See application file for complete search history.

(56) References Cited

U.S. PATENT DOCUMENTS

| | | | | |
|---|---|---|---|---|
| 7,260,085 B2* | 8/2007 | Dobbins et al. | ............... | 370/352 |
| 7,898,955 B1* | 3/2011 | Wang et al. | .................. | 370/235 |
| 7,961,637 B2* | 6/2011 | McBeath | ...................... | 370/252 |
| 7,974,279 B2* | 7/2011 | Kambhampati et al. | ...... | 370/389 |
| 2001/0032272 A1 | 10/2001 | Fujita | | |
| 2008/0080518 A1* | 4/2008 | Hoeflin et al. | ........... | 370/395.42 |
| 2010/0124180 A1* | 5/2010 | Benkis | .......................... | 370/252 |

FOREIGN PATENT DOCUMENTS

| | | |
|---|---|---|
| JP | 2001-308912 | 11/2001 |
| JP | 2005-236881 | 9/2005 |
| JP | 2005-252368 | 9/2005 |
| JP | 2006-033235 | 2/2006 |

\* cited by examiner

*Primary Examiner* — Dmitry H Levitan
(74) *Attorney, Agent, or Firm* — Katten Muchin Rosenman LLP

(57) ABSTRACT

A method of specifying an input edge router has: obtaining a first value of an input packet counter from each of input candidate edge routers having possibility to receive a specified packet passing through a specified area; transmitting a test packet having a destination address of an output edge router supplying the specified packet or a test packet having a destination address of the specified packet, to a source router connected to a network indicated by a source address of the specified packet; obtaining a second value of the input packet counter from each of the input candidate edge routers; calculating a difference between the first and second values in each input candidate edge router; and specifying an input edge router through which the specified packet passes according to the difference.

7 Claims, 17 Drawing Sheets

FIG. 6

| SOURCE ADDRESS | DESTINATION ADDRESS | SOURCE ROUTER | PATH IN AREA |
|---|---|---|---|
| 12.0.0.0/8 | 10.0.0.0/8 | g | a→e→h→d |
| 12.0.0.0/8 | 10.0.0.0/8 | g | b→c→d |
| ... | ... | ... | ... |

FIG. 7

| INPUT CANDIDATE EDGE ROUTER | INPUT PACKET NUMBER BEFORE TEST PACKET TRANSMISSION | INPUT PACKET NUMBER AFTER TEST PACKET TRANSMISSION |
|---|---|---|
| a | 3 | 3 |
| b | 2 | 1002 |

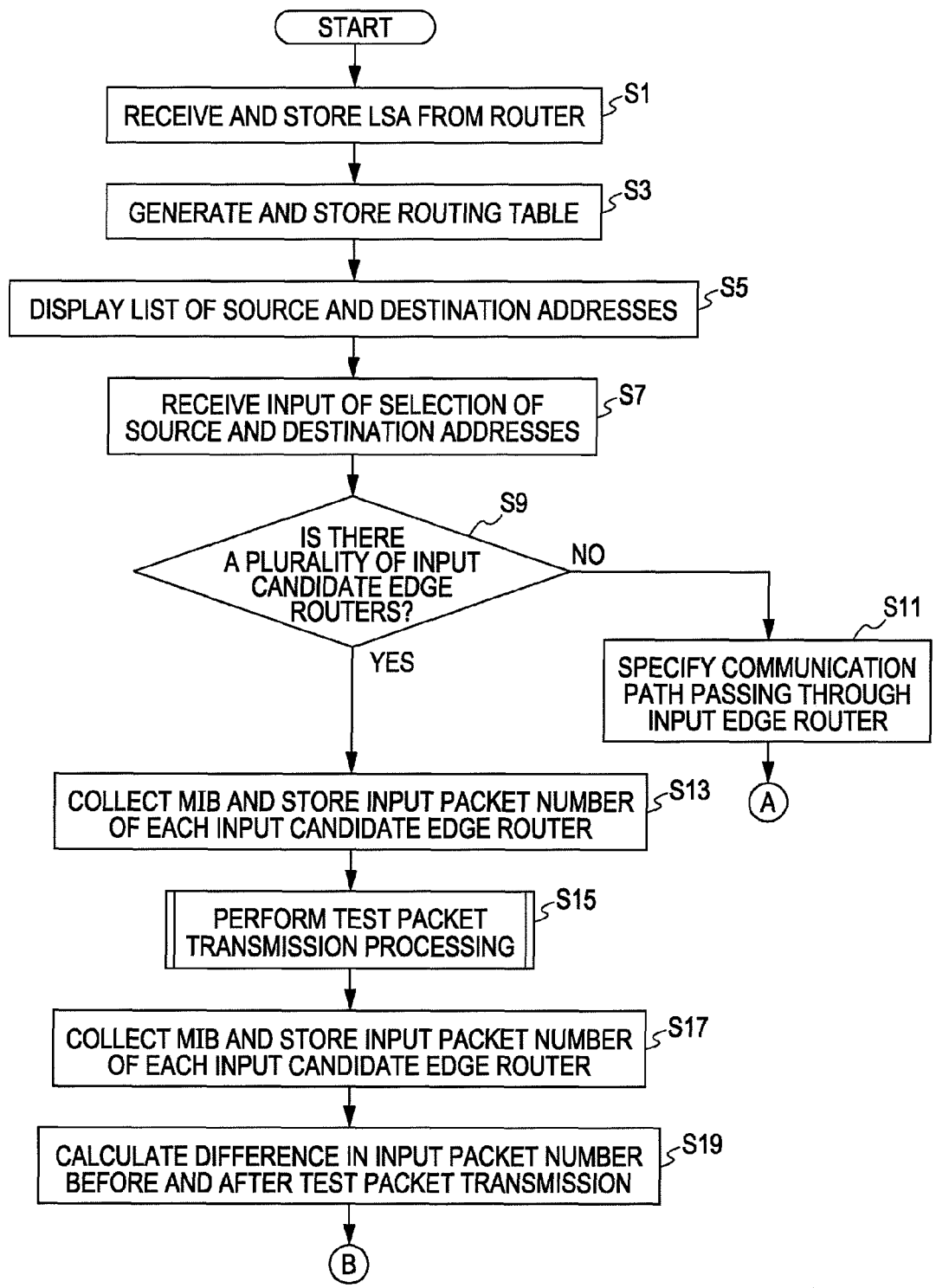

FIG. 9

| | |
|---|---|
| etherStatsUndersizePkts | NUMBER OF PACKETS HAVING LENGTH LESS THAN 64 BYTES, OF RECEIVED PACKETS |
| etherStatsOversizePkts | NUMBER OF PACKETS HAVING LENGTH MORE THAN 1518 BYTES, OF RECEIVED PACKETS |
| etherStatsPkts64Octets | NUMBER OF PACKETS HAVING LENGTH OF 64 BYTES, OF RECEIVED PACKETS |
| etherStatsPkts65to127Octets | NUMBER OF PACKETS HAVING LENGTH OF 65 TO 127 BYTES, OF RECEIVED PACKETS |
| etherStatsPkts128to255Octets | NUMBER OF PACKETS HAVING LENGTH OF 128 TO 255 BYTES, OF RECEIVED PACKETS |
| etherStatsPkts256to511Octets | NUMBER OF PACKETS HAVING LENGTH OF 256 TO 511 BYTES, OF RECEIVED PACKETS |
| etherStatsPkts512to1023Octets | NUMBER OF PACKETS HAVING LENGTH OF 512 TO 1023 BYTES, OF RECEIVED PACKETS |
| etherStatsPkts1024to1518Octets | NUMBER OF PACKETS HAVING LENGTH OF 1024 TO 1518 BYTES, OF RECEIVED PACKETS |

| INPUT CANDIDATE EDGE ROUTER | INPUT PACKET NUMBER BEFORE TEST PACKET TRANSMISSION | INPUT PACKET NUMBER AFTER TEST PACKET TRANSMISSION |
|---|---|---|
| a | 3 | 503 |
| b | 2 | 502 |

METHOD FOR SPECIFYING INPUT EDGE ROUTER

CROSS-REFERENCE TO RELATED APPLICATION

This application is based upon and claims the benefit of priority from the prior Japanese Patent Application No. 2008-296233 filed on Nov. 20, 2008, the entire contents of which are incorporated herein by reference.

BACKGROUND

1. Field

This invention relates to a technology for specifying a communication path in a specific area on a network divided into a plurality of areas.

2. Description of Related Art

An example of an Internet Protocol (IP) network is illustrated in FIG. 1. In this network, it is desired that a communication path on the network can be specified, for example, for the following purposes: (1) to check whether the communication path follows the design of the network; (2) to specify a path to be affected in case degradation in communication quality occurs; (3) to specify a path around which a maintenance worker needs to detour at a maintenance work.

For example, an Open Shortest Path Fast (OSPF) protocol is used in a routing control in the IP network. In the OSPF, respective network devices (for example, a router) exchange packets called Link State Advertisement (LSA) to generate and store a topology and a routing table.

There is a technology for specifying a communication path in a network which performs the routing through the OSPF by providing a monitoring server which captures packets flowing in the network to collect the LSA. FIG. 2 illustrates an example of the case of providing with the monitoring server. In FIG. 2, the monitoring server captures the packets flowing in a router e and generates and maintains the same topology and routing table as the router. For example, the path passing through a router g, a router b, a router c, a router d and a router i is specified as the communication path of the packet transmitted from "12.0.0.0/8" to "10.0.0.0/8". In FIG. 2, the router g and the router i are the Autonomous System Boundary Routers (ASBRs).

Further, the network may be operated, divided into a plurality of areas, as illustrated in FIG. 3, in order to reduce the loads on the router in the OSPF. In FIG. 3, a router g and a router i are the ASBRs and a router a, a router b, a router d, and a router f are the area border routers (ABR: Area Border Router) (hereinafter, the area border router is referred to as an edge router). In this case, it may happen that the monitoring server connected to the backbone (Backbone) cannot obtain the detailed LSA about an area other than the area to which the server is connected (i.e. Area 1 and Area 2). In FIG. 3, the packets transmitted from "12.0.0.0/8" to "10.0.0.0/8" pass through the router a or the router b. The edge router which receives packets from a router in a neighboring area is referred to as an input edge router. When the monitoring server cannot obtain the detailed LSA about the Area 1, the communication path in the Area 1 is left unspecified, consequently, the edge router which receives the packets cannot be specified. Therefore, the monitoring server cannot specify the input edge router and, as a result, the monitoring server cannot specify the communication path in the Backbone. In this case, it is necessary to provide another monitoring server on the Area 1 which is not monitored, in order to specify the communication path in the Backbone.

SUMMARY

According to an embodiment of the present invention, a method of specifying an input edge router has: obtaining a first value of an input packet counter from each of input candidate edge routers having possibility to receive a specified packet passing through a specified area; transmitting a test packet having a destination address of an output edge router supplying the specified packet, or a test packet having a destination address of the specified packet, to a source router connected to a network indicated by a source address of the specified packet; obtaining a second value of the input packet counter as a second number from each of the input candidate edge routers and storing the values as a second number; calculating a difference between the first and second values in each input candidate edge router; and specifying an input edge router through which the specified packet passes according to the difference.

It is to be understood that both the foregoing summary description and the following detailed description are explanatory as to some embodiments of the present invention, and not restrictive of the present invention as claimed.

BRIEF DESCRIPTION OF DRAWINGS

FIG. 6 illustrates an example of a routing table.
FIG. 7 illustrates an example of a count table.
FIG. 8 illustrates a processing flow of the monitoring server.
FIG. 9 illustrates a counter included in RMON MIB information.

DETAILED DESCRIPTION OF EXAMPLE EMBODIMENTS

First Embodiment

Figure 1:
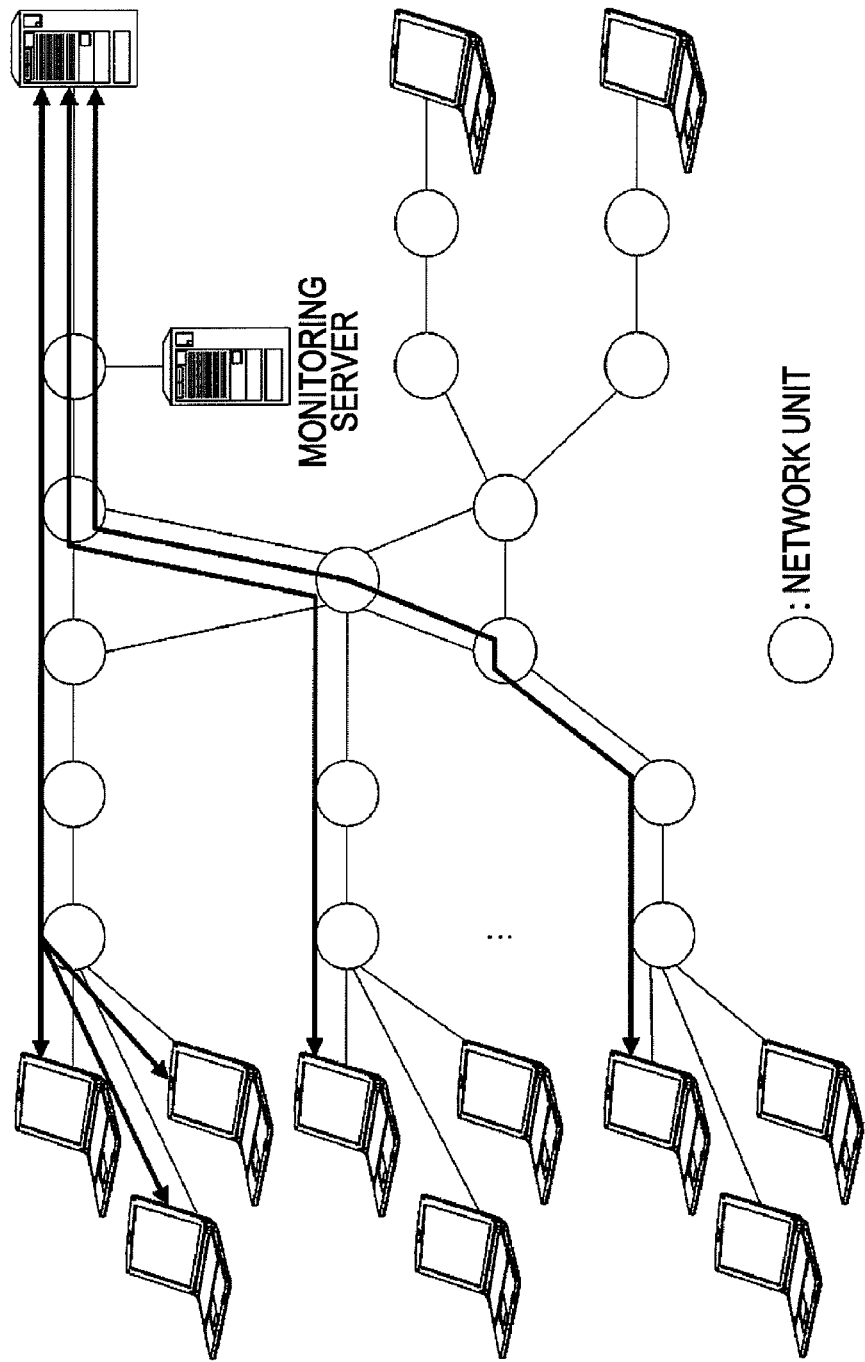
FIG. 1 illustrates an example of an IP network.
Figure 2:
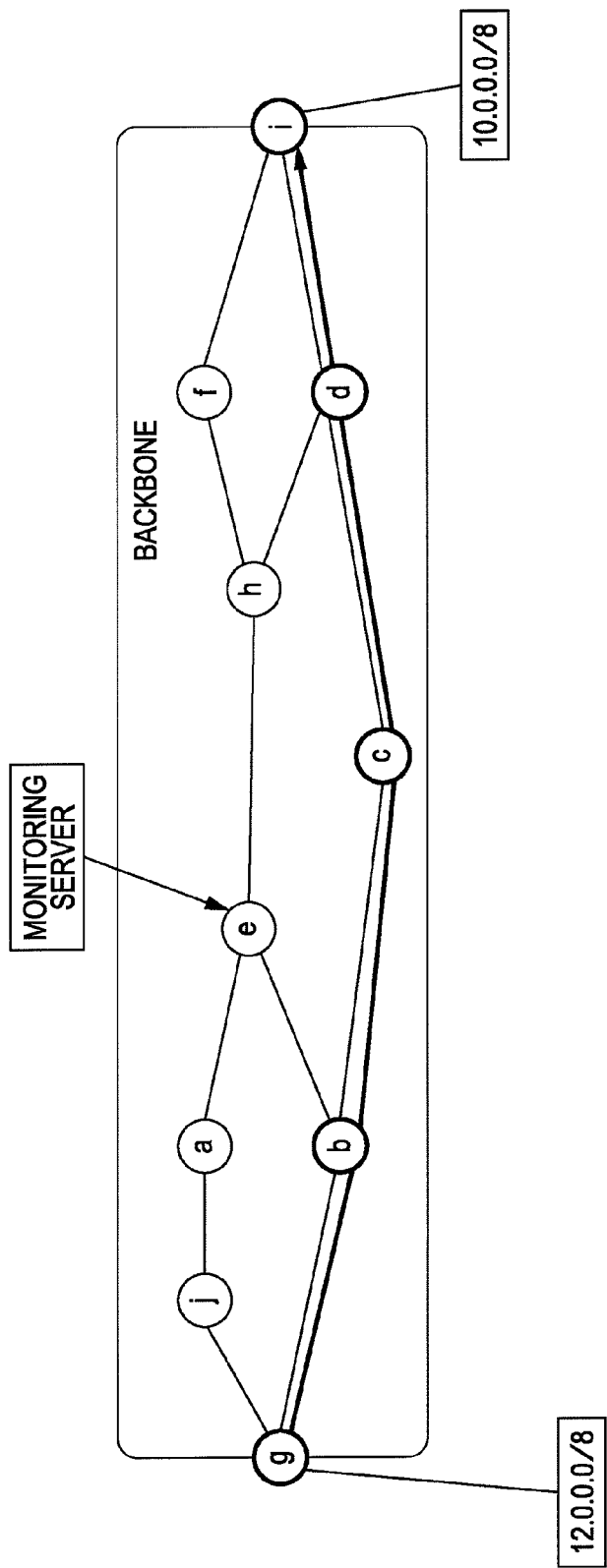
FIG. 2 illustrates a network according to related art.
Figure 3:
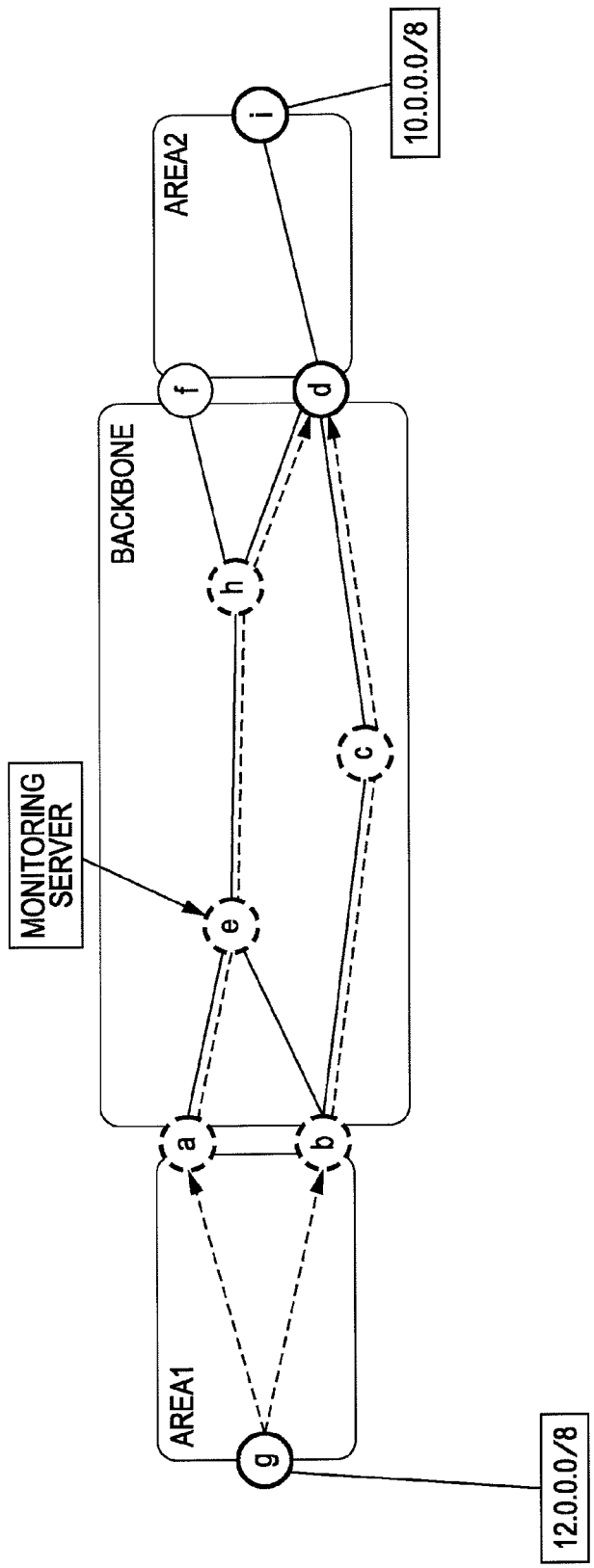
FIG. 3 illustrates a network according to related art.
Figure 4:
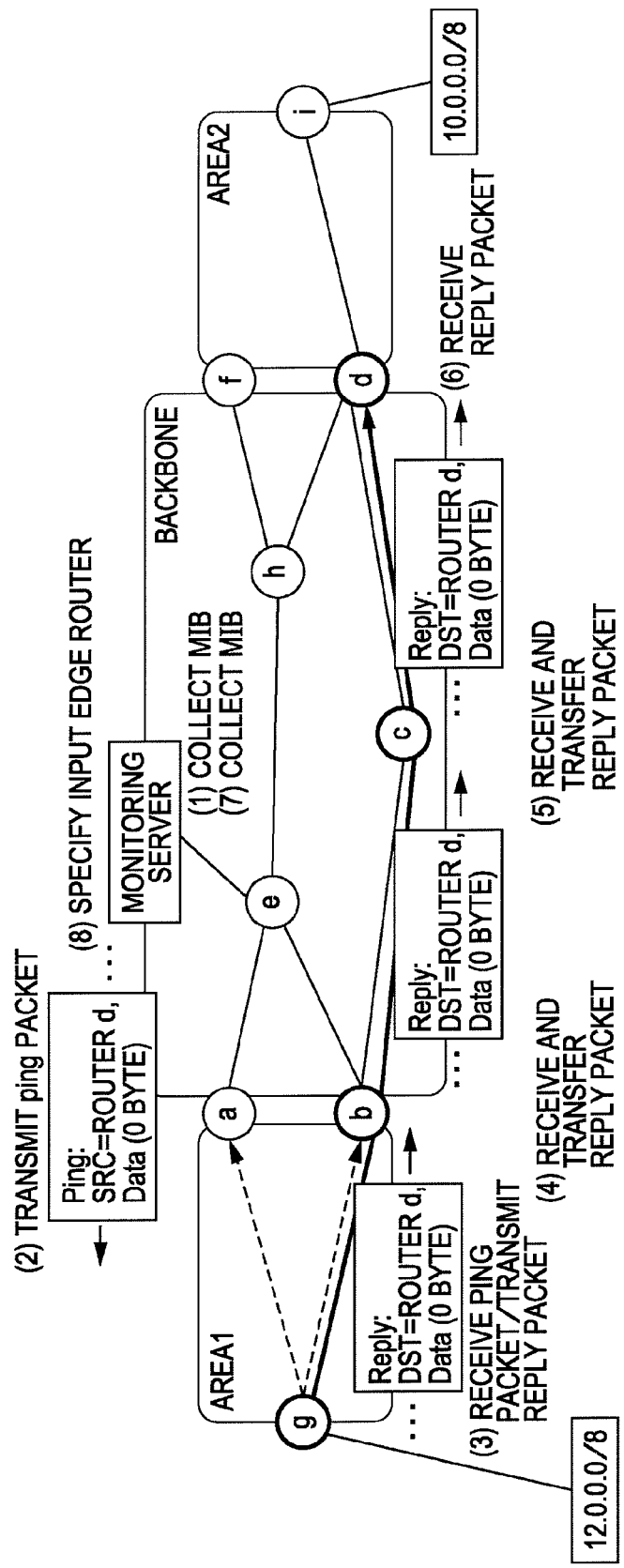
FIG. 4 illustrates an outline of a first embodiment of the invention.

A first embodiment of this technology will be described with reference to FIGS. 4 to 15. At first, an outline of the first embodiment will be described with reference to FIG. 4. A network as illustrated in FIG. 4 is configured, for example, with routers a to i carrying out routing according to the OSPF. The network is divided into three areas, i.e. an Area 1, a Backbone, and an Area 2. In FIG. 4, the router g and the router i are the ASBRs, connected respectively to a subnet "12.0.0.0/8" and a subnet "10.0.0.0/8." The router a and the router b are edge routers arranged in a boundary between the Area 1 and the Backbone. The router f and the router d are edge routers arranged in a boundary between the backbone and the Area 2. The router c, the router e, and the router h are internal routers of the Backbone. The monitoring server for observing the Backbone is connected to the router e. It is assumed that the monitoring server cannot obtain a detailed LSA about the Area 1 and the Area 2.

For example, packets transmitted from "12.0.0.0/8" to "10.0.0.0/8" are received from the router g in the Area 1 to either the router a or the router b. Since the monitoring server cannot obtain the detailed LSA about the Area 1, it cannot specify the input edge router. In this embodiment, a source router (the router g in FIG. 4) transmits a test packet destined to an output edge router (the router d in FIG. 4), to specify the input edge router based on a difference of an input packet counter before and after transmission of the test packet. It is assumed that as for the packets transmitted from "12.0.0.0/8" to "10.0.0.0/8," the router d becomes the output edge router, based on the LSA collected in advance.

Specifically, the monitoring server collects Remote Network Monitoring Management Information Base (RMON MIB) information from each of the router a and the router b through the router e and stores the value of the input packet counter included in the RMON MIB information as a first input packet number (FIG. 4: Step (1)). The monitoring server transmits a Packet InterNet Groper (ping) packet to the router g for a predetermined number of times (Step (2)). The monitoring server does not set its own address but sets the address of the router d in the source address (SRC) of the ping packet. In this embodiment, the size of a data unit of the ping packet is 0 byte.

The router g receives the ping packets from the monitoring server one after another and transmits reply packets corresponding to the ping packets to the router d one after another (Step (3)). Although the ping packet is transmitted by the monitoring server, the SRC of the ping packet has the address of the router d, so that the router g transmits a reply packet to the router d.

The router b receives the reply packets from the router g one after another and transfers them to the router c (Step (4)). Here, the input packet counter of the router b is counted up by the number of the reply packets. The router c receives the reply packets from the router b one after another and transfers them to the router d (Step (5)). The router d receives the reply packets from the router c (Step (6)).

The monitoring server collects the RMON MIB information again from each of the router a and the router b through the router e, and stores the values of the input packet counters included in the RMON MIB information as a second input packet number (Step (7)). The monitoring server calculates a difference between the first input packet number and the second input packet number for each of the router a and the router b, and specifies the input edge router based on the calculated difference (Step (8)). Since the input packet counter of the router a and/or the router b through which the reply packet has passed as the test packet is counted up by the number of times the ping packet is transmitted, the router having the difference between the first input packet number and the second input packet number more approximate to the number of times the ping packet is transmitted is specified as the input edge router. In the example of FIG. 4, the router b is specified as the input edge router.

Figure 5:
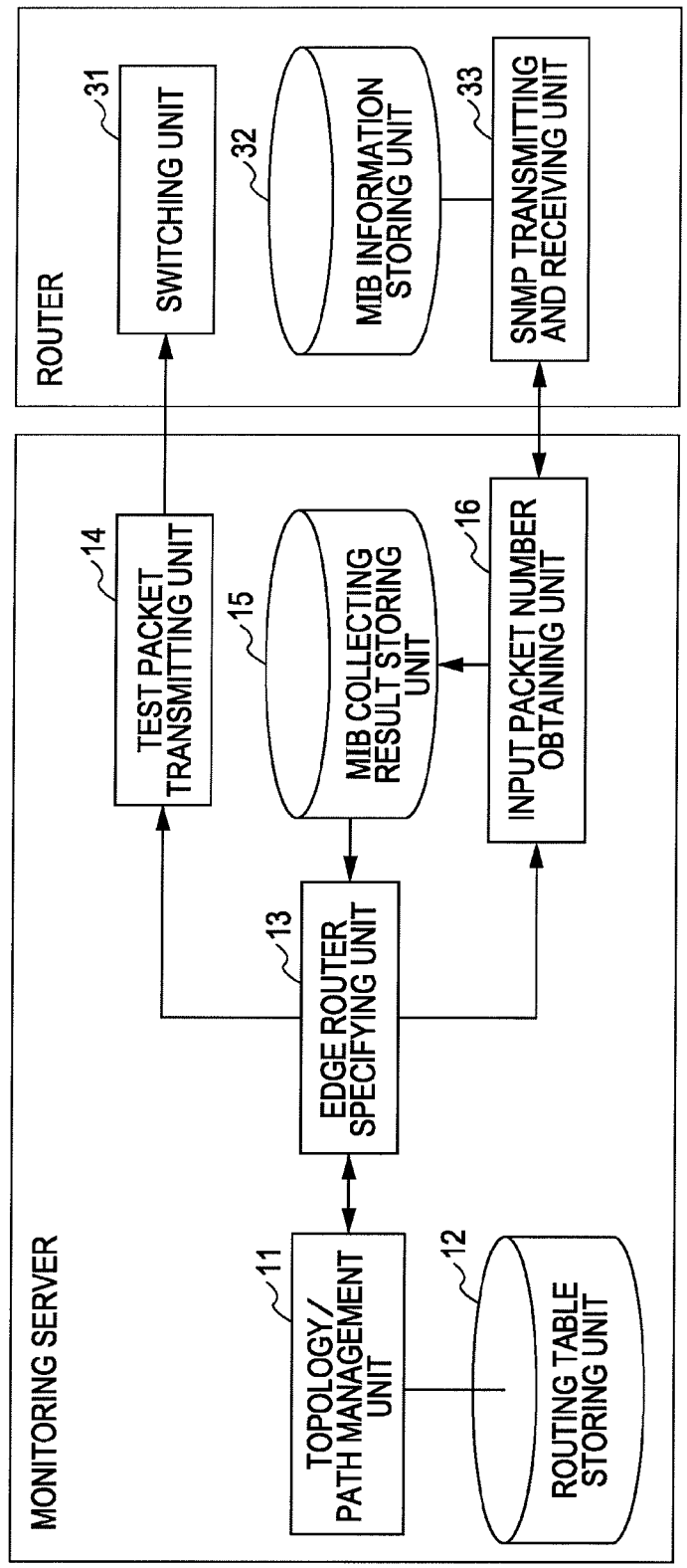
FIG. 5 is a functional block diagram of a monitoring server and a router.

FIG. 5 illustrates a functional block diagram of the monitoring server and the router of the first embodiment. The monitoring server includes a topology/path management unit 11, a routing table storing unit 12, an edge router specifying unit 13, a test packet transmitting unit 14, an MIB collecting result storing unit 15, and an input packet number obtaining unit 16. The router includes a switching unit 31, an MIB information storing unit 32, and an SNMP transmitting and receiving unit 33.

The topology/path management unit 11 collects the LSA from the respective routers, generates a routing table, stores it in the routing table storing unit 12, and instructs the edge router specifying unit 13 to specify an input edge router. According to the instruction from the topology/path management unit 11, the edge router specifying unit 13 executes processes such as instructing the test packet transmitting unit 14 to transmit the ping packet, instructing the input packet number obtaining unit 16 to issue the Simple Network Management Protocol (SNMP) command for collecting the RMON MIB information, and specifying the input edge router based on the data stored in the routing table storing unit 12 and the MIB collecting result storing unit 15. The test packet transmitting unit 14 carries out the test packet transmission processing described later, according to the instruction from the edge router specifying unit 13. The MIB collecting result storing unit 15 stores the count table described later. According to the instruction from the edge router specifying unit 13, the input packet number obtaining unit 16 issues the SNMP command for collecting the RMON MIB information to the router and stores the collected RMON MIB information into the MIB collecting result storing unit 15.

The switching unit 31 is connected to another router through a transmission channel and performs the packet transfer processing according to the routing table (not illustrated). The SNMP transmitting and receiving unit 33 transmits the RMON MIB information stored in the MIB information storing unit 32 to the monitoring server, in reply to a request from the monitoring server.

FIG. 6 illustrates an example of a routing table stored in the routing table storing unit 12. In the example of FIG. 6, the routing table includes each row of source address, destination address, source router, and path in area. The source router includes the identification information of a router to be connected to a network indicated by the source address in each record. The path in area includes the information of a communication path in an area of a packet transmitted from the source address to the destination address in each record.

FIG. 7 illustrates an example of a count table stored in the MIB collecting result storing unit 15. In the example of FIG. 7, the count table includes each row of input candidate edge router, input packet number before test packet transmission, and input packet number after test packet transmission.

Next, with reference to FIGS. 8 to 15, the specific processing flow of the monitoring server illustrated in FIG. 5 will be described. At first, the topology/path management unit 11 receives the LSA from the respective routers and stores the same temporarily into a storing device (FIG. 8: Step S1). The topology/path management unit 11 generates a routing table from the LSA stored in the storing device and stores it into the routing table storing unit 12 (Step S3). For example, the routing table as illustrated in FIG. 6 is generated.

The topology/path management unit 11 has a display and the like to show a list of the source addresses and the destination addresses included in the routing table, for example, in reply to a list displaying request from a user (Step S5).

For example, a user selects a specific source address and destination address of a target from the displayed list of the source addresses and the destination addresses. The topology/path management unit 11 receives the input of the selection of the specific source address and destination address and stores the information of the specific source address and destination address temporarily into the storing device (Step S7). The topology/path management unit 11 instructs the edge router specifying unit 13 to specify an input edge router.

According to the instruction from the topology/path management unit 11, the edge router specifying unit 13 checks whether there is a plurality of input candidate edge routers, with reference to the routing table based on the specific source address and destination address stored in the storing device (Step S9). Specifically, it searches the routing table for the record including the specific source address and destination address, to check whether there is a plurality of corresponding records. When there is only one input candidate edge router (Step S9: No route), the edge router specifying unit 13 specifies the input candidate edge router as the input edge router and specifies a communication path passing through the input edge router (Step S11). Then, this processing will be completed through the terminal A.

On the other hand, when there is a plurality of input candidate edge routers (Step S9: Yes route), the edge router specifying unit 13 instructs the input packet number obtaining unit 16 to obtain the RMON MIB information. In reply to the instruction from the edge router specifying unit 13, the input packet number obtaining unit 16 transmits the SNMP command to the respective input candidate edge routers and collects the RMON MIB information from the respective input candidate edge routers. The input packet number obtaining unit 16 stores the values of the input packet counters included in the collected RMON MIB information in the count table for every input candidate edge router as the first input packet number (Step S13). Specifically, the input packet number obtaining unit 16 stores the above in each row of the input packet number before test packet transmission in the count table. The input packet counters are stored for every interface and each counter is further divided into a plurality of counters depending on the counter packet size, as illustrated in FIG. 9. Since a packet with the packet size of 64 byte or less is used as the test packet in this embodiment, the total of the etherStatsUndersizePkts and the etherStatsPkts64Octets in FIG. 9 is stored in the count table.

Then, the edge router specifying unit 13 instructs the test packet transmitting unit 14 to transmit the ping packet. According to the instruction from the edge router specifying unit 13, the test packet transmitting unit 14 performs the test packet transmission processing (Step S15). The test packet transmission processing will be described with reference to FIG. 10.

Figure 10:
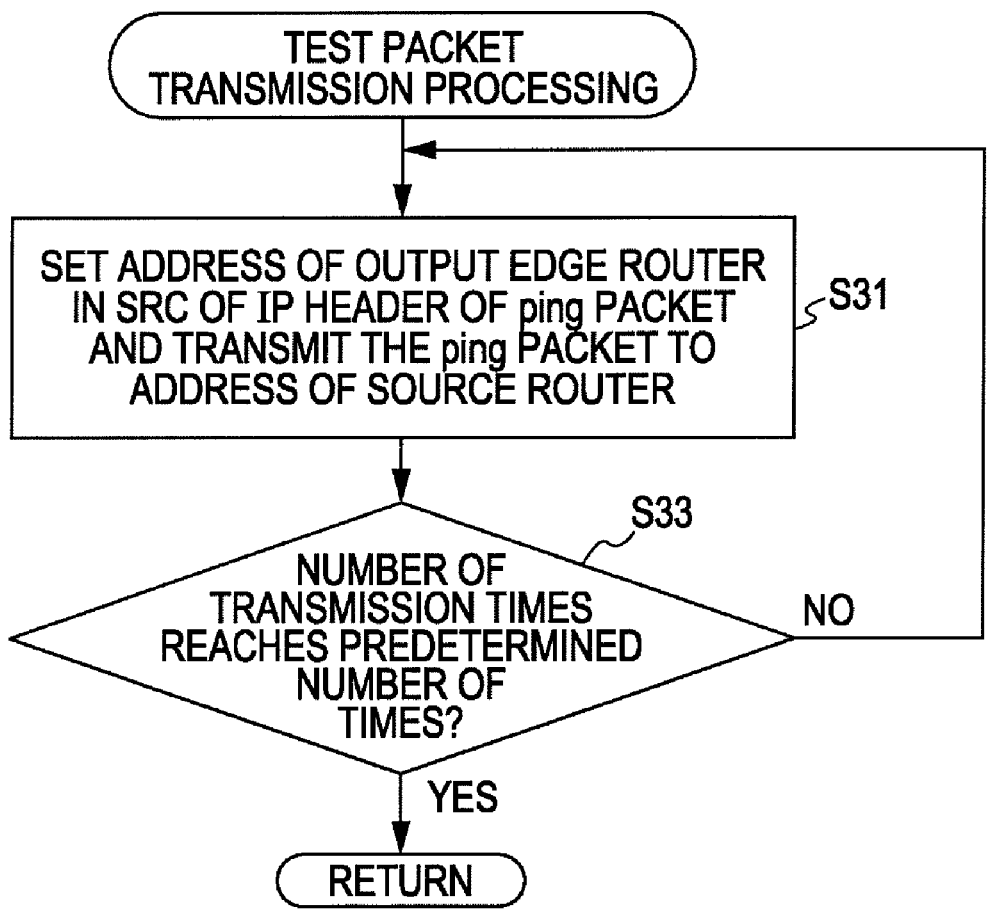
FIG. 10 is a flow chart of a test packet transmission processing.

At first, the test packet transmitting unit 14 sets the address of the output edge router (the router d in FIG. 4) in the source address (SRC) of the IP header of the ping packet to be transmitted and transmits the same ping packet to the address of the source router (router g in FIG. 4) (FIG. 10: Step S31). The test packet transmitting unit 14 checks whether the number of times the ping packet is transmitted reaches a predetermined number of times (Step S33). When it has not reached the predetermined number (Step S33: No route), the processing returns to Step S31, where the processing in Step S31 to Step S33 is repeated.

On the other hand, when the number of times the ping packet is transmitted reaches the predetermined number (Step S33: Yes route), the test packet transmission processing is finished, returning back to the original processing.

Since the address of the output edge router is set in the SRC of the ping packet, the source router transmits a reply packet not to the monitoring server but to the output edge router, upon receipt of the ping packet. Namely, by performing the above test packet transmission processing, it is possible to transmit the test packet destined for the address of the output edge router, to the address of the source router for a predetermined number of times. Here, instead of the address of the output edge router, for example, the destination address selected and entered in Step S7 may be set in the SRC of the IP header of the ping packet.

Returning to the description of FIG. 8, after the test packet transmission processing is performed, the edge router specifying unit 13 instructs the input packet number obtaining unit 16 to obtain the RMON MIB information. According to the instruction from the edge router specifying unit 13, the input packet number obtaining unit 16 transmits the SNMP command to the respective input candidate edge routers and collects the RMON MIB information from the respective input candidate edge routers. The input packet number obtaining unit 16 stores the values of the input packet counters included in the collected RMON MIB information in the count table for every input candidate edge router as the second input packet number (Step S17). More specifically, it stores the above into each row of the input packet number after test packet transmission in the count table. As mentioned above, the total of the etherStatsUndersizePkts and the etherStatsPkts64Octets is stored in the count table.

Then, the edge router specifying unit 13 calculates a difference between the number of the input packets before test packet transmission stored in the count table (namely, the first input packet number) and the number of the input packets after test packet transmission (namely, the second input packet number) for every input candidate edge router and stores the above temporarily in the storing unit (Step S19). Then, the processing proceeds to Step S21 (FIG. 11) through the terminal B.

Figures 11, 12:
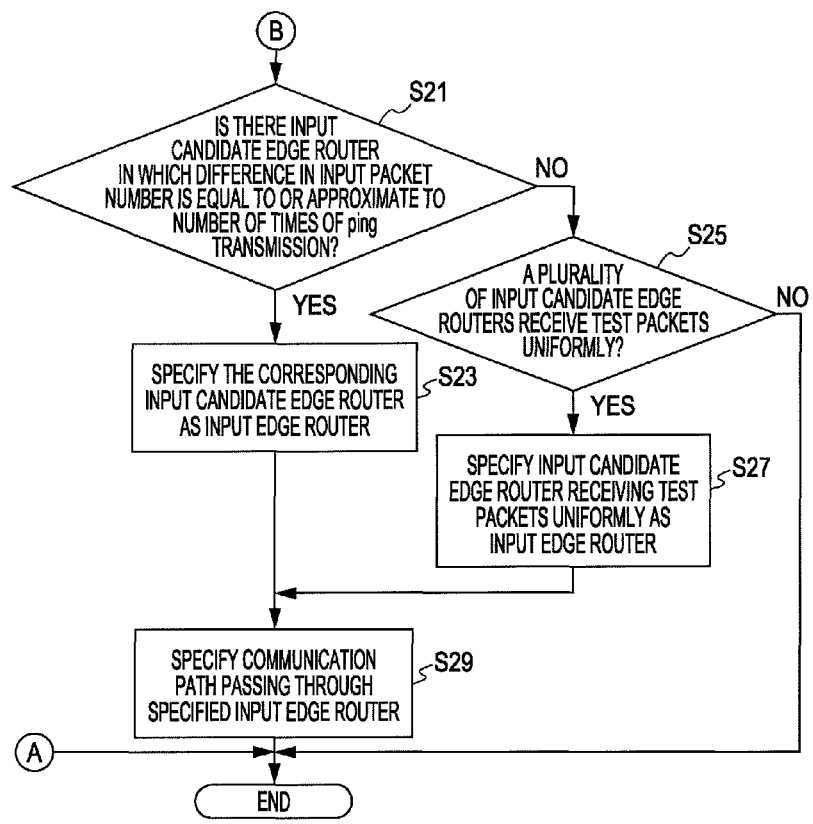
FIG. 11 is a flow chart of a processing by the monitoring server.
FIG. 12 illustrates an example of the count table.

Moving to the description of FIG. 11, after the terminal B, the edge router specifying unit 13 checks whether there is an input candidate edge router in which a difference between the numbers of the input packets respectively before and after the test packet transmission is equal to or approximate to the number of times the ping packet is transmitted (FIG. 11: Step S21). When it is judged that there is such an input candidate edge router as the above (Step S21: Yes route), the edge router specifying unit 13 specifies the corresponding input candidate edge router as the input edge router (Step S23). For example, assuming that the data as illustrated in FIG. 7 is stored in the count table in the case of one thousand times of transmission of the ping packet, the difference of the input packets becomes 1000 in the input candidate edge router b, and the input candidate edge router b is specified as the input edge router. The process proceeds to Step S29. Here, the input edge router specified in this step may be presented to a user so that the user can make a final decision.

On the other hand, when it is judged that there is not any input candidate edge router in which the difference between the numbers of the input packets respectively before and after the test packet transmission is equal to or approximate to the number of times the ping packet is transmitted (Step S21: No route), the edge router specifying unit 13 checks whether a plurality of the input candidate edge routers receives the test packets uniformly (Step S25). When it is judged that a plurality of the input candidate edge routers receives the test packets uniformly (Step S25: Yes route), the edge router specifying unit 13 specifies the corresponding several input candidate edge routers as the input edge router (Step S27).

For example, assuming that the data as illustrated in FIG. 12 is stored in the count table in the case of one thousand times of transmission of the ping packet, a difference between the respective numbers of the input packets before and after the test packet transmission becomes 500 respectively in the input candidate edge routers a and b. Therefore, it is judged that the input candidate edge routers a and b receive the test packets uniformly, and the input candidate edge routers a and b are specified as the input edge router. Then, the processing proceeds to Step S29. Here, the several input edge routers specified in this step may be presented to a user so that the user can make a final decision.

On the other hand, when the several input candidate edge routers do not receive the test packets uniformly (Step S25: No route), the processing is terminated. In this case, the count table and the difference between the respective numbers of the input packets before and after the transmission of the test packets may be presented to a user as the processing results.

Then, after the processing of Step S23 or Step S27, the edge router specifying unit 13 specifies a communication path passing through the specified input edge router (Step S29). When the several input edge routers are specified, each of the communication paths passing through the corresponding input edge routers are specified in every input edge router. The specified communication paths are displayed on the display. Then this processing is terminated.

Through the above-mentioned processing, the input edge router as for the packets passing through a specified area can be specified by a monitoring server for monitoring a specified area and therefore, the communication path can be specified. Without mounting another monitoring server in another area, it is possible to specify a communication path of a specified area, thereby restraining the cost of the whole network.

Figure 13:
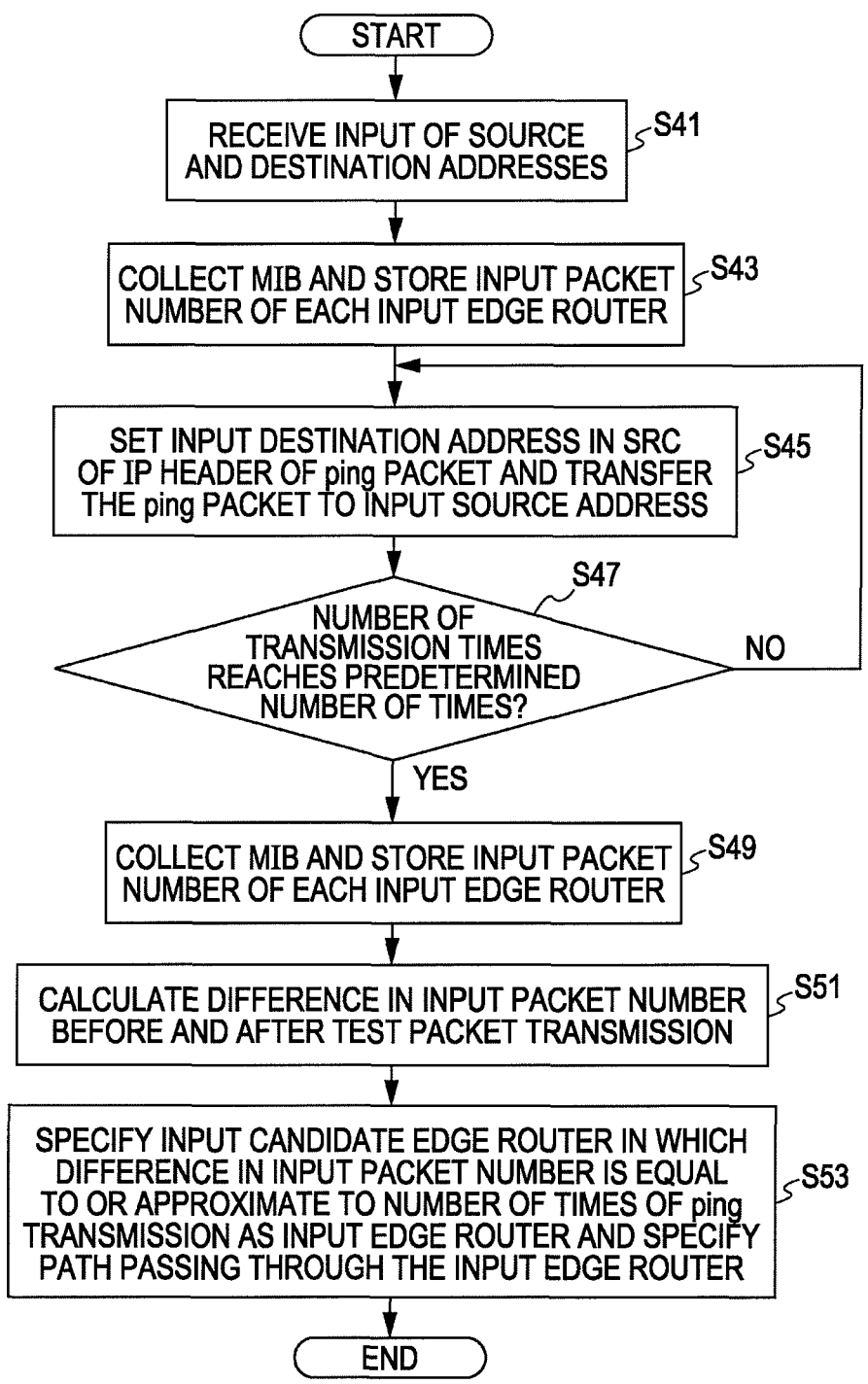
FIG. 13 illustrates a processing flow by the monitoring server.

For example, when the network address for specifying a subnet is selectively entered as a specified source address or a specified destination address in Step S7 and a plurality of input edge routers is specified, each communication path between the respective terminals is specified by performing the processing illustrated in FIG. 13, depending on necessity.

Specifically, a user enters the address of a specified terminal within a subnet specified by the source address as a new source address and enters the address of a specified terminal within a subnet specified by the destination address as a new destination address. Here, the user may enter only one of them.

The topology/path management unit 11 receives the input of the new source address and destination address from the user and stores the same temporarily in the storing unit (FIG. 13: Step S41). The topology/path management unit 11 instructs the edge router specifying unit 13 to specify an input edge router. The edge router specifying unit 13 instructs the input packet number obtaining unit 16 to obtain the RMON MIB information according to the instruction from the topology/path management unit 11.

The input packet number obtaining unit 16 transmits the SNMP command to the respective input candidate edge routers, according to the instruction from the edge router specifying unit 13, and collects the RMON MIB information from the respective input candidate edge routers. The input packet number obtaining unit 16 stores the values of the input packet counters included in the collected RMON MIB information in the count table for every input candidate edge router as the first input packet number (Step S43). Specifically, it stores the above in the column of the input packet number before test packet transmission in the count table. As described above, the total of the etherStatsUndersizePkts and the etherStatsPkts64Octets is stored in the count table.

Then, the edge router specifying unit 13 instructs the test packet transmitting unit 14 to transmit the ping packet.

According to the instruction from the edge router specifying unit 13, the test packet transmitting unit 14 sets the destination address entered in Step S41 in the SRC (source address) of the IP header of the ping packet to be transmitted and transmits the above ping packet to the source address entered in Step S41 (Step S45).

Figure 14:
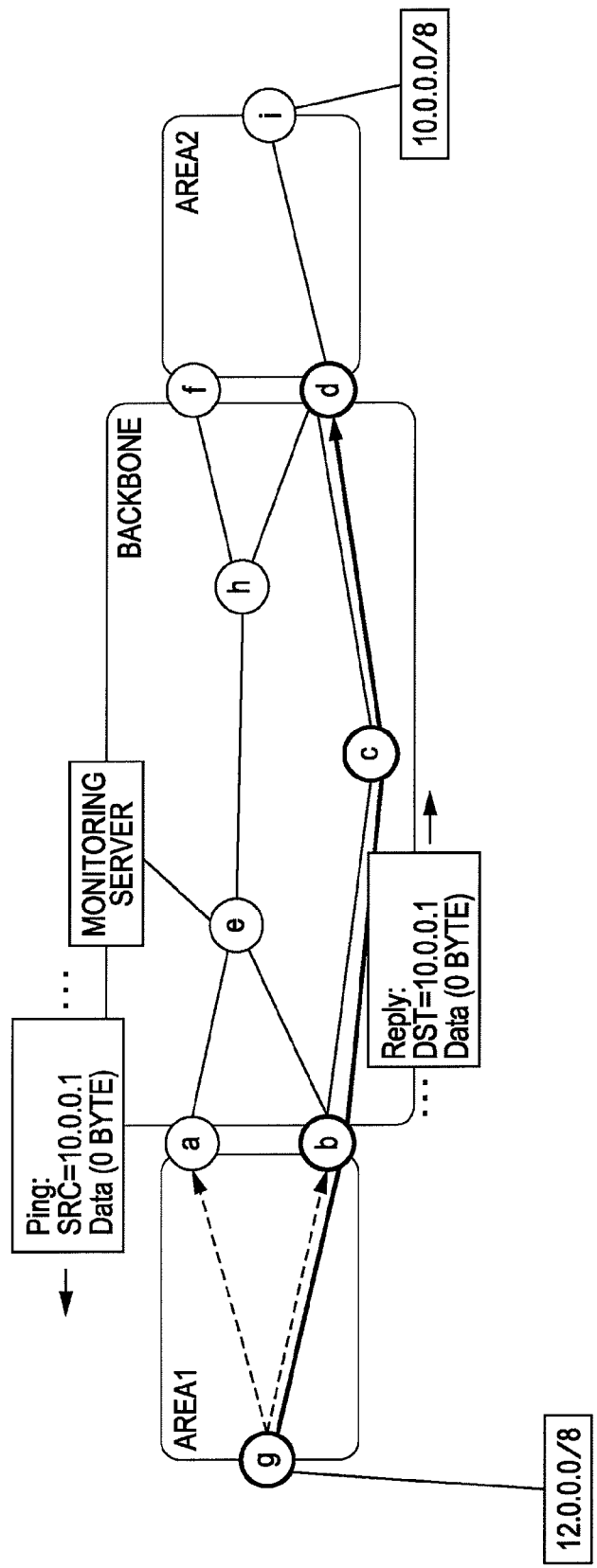
FIG. 14 illustrates processing at specifying a communication path between terminals.
Figure 15:
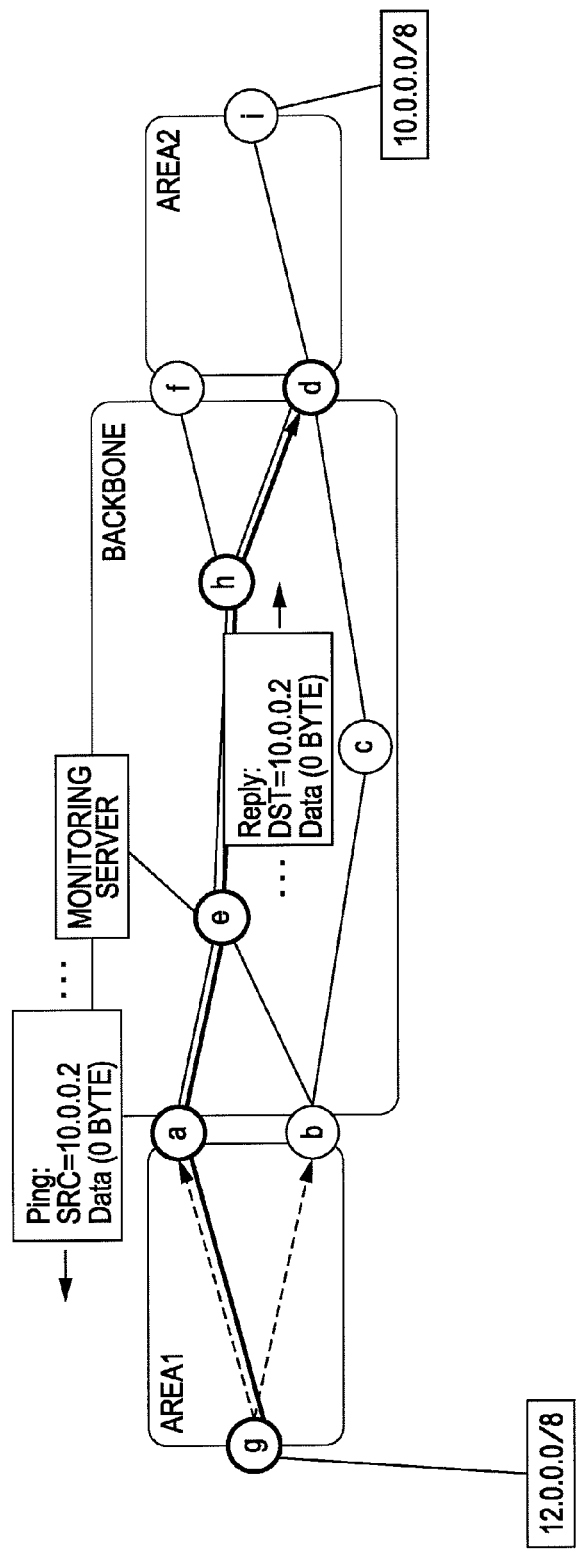
FIG. 15 illustrates processing at specifying a communication path between terminals.

For example, when "12.0.0.1" and "10.0.0.1" are entered respectively as the source address and the destination address, the test packet transmitting unit 14 sets "10.0.0.1" in the SRC of the IP header of the ping packet as illustrated in FIG. 14, and transmits the same ping packet to "12.0.0.1". Since "10.0.0.1" is set in the SRC of the ping packet, a reply packet for the destination "10.0.0.1" is transmitted. FIG. 14 illustrates the reply packet passing through the router b. Further, for example, when "12.0.0.1" and "10.0.0.2" are entered respectively as the source address and the destination address, it sets "10.0.0.2" in the SRC of the IP header of the ping packet as illustrated in FIG. 15 and transmits the same ping packet to "12.0.0.1". Since "10.0.0.2" is set in the SRC of the ping packet, a reply packet for the destination "10.0.0.2" is transmitted. FIG. 15 illustrates the reply packet passing through the router a.

The test packet transmitting unit 14 checks whether the number of times the ping packet is transmitted reaches a predetermined number of times (Step S47). When it has not reached the predetermined number (Step S47: No route), the processing returns to Step S45, and S45 and Step S47 are repeated. On the other hand, when it reaches the predetermined number (Step S47: Yes route), the processing proceeds to Step S49.

Moving to Step S49, the edge router specifying unit 13 instructs the input packet number obtaining unit 16 to obtain the RMON MIB information. According to the instruction from the edge router specifying unit 13, the input packet number obtaining unit 16 transmits the SNMP command to the respective input candidate edge routers and collects the RMON MIB information from the respective input candidate edge routers. The input packet number obtaining unit 16 stores the values of the input packet counters included in the collected RMON MIB information in the count table for every input candidate edge router as the second input packet number (Step S49). Specifically, the input packet number obtaining unit 16 stores the above in the column of the input packet number after test packet transmission in the count table. As described above, the total of the etherStatsUndersizePkts and the etherStatsPkts64Octets is stored in the count table.

Then, the edge router specifying unit 13 calculates a difference between the number of the input packets before test packet transmission (namely, the first input packet number) and the number of the input packets after test packet transmission (namely, the second input packet number) stored in the count table, for every input candidate edge router, and stores the above temporarily in the storing unit (Step S51).

The edge router specifying unit 13 specifies the input candidate edge router in which a difference between the numbers of the input packets respectively before and after test packet transmission is equal to or approximate to the number of times the ping packet is transmitted, as the input edge router, and specifies a communication path passing through the input edge router (Step S53). The specified communication path is displayed on the display and this processing is terminated.

By performing the above-mentioned processing, a user can check communication path between the individual terminals depending on necessity.

Second Embodiment

Figure 16:
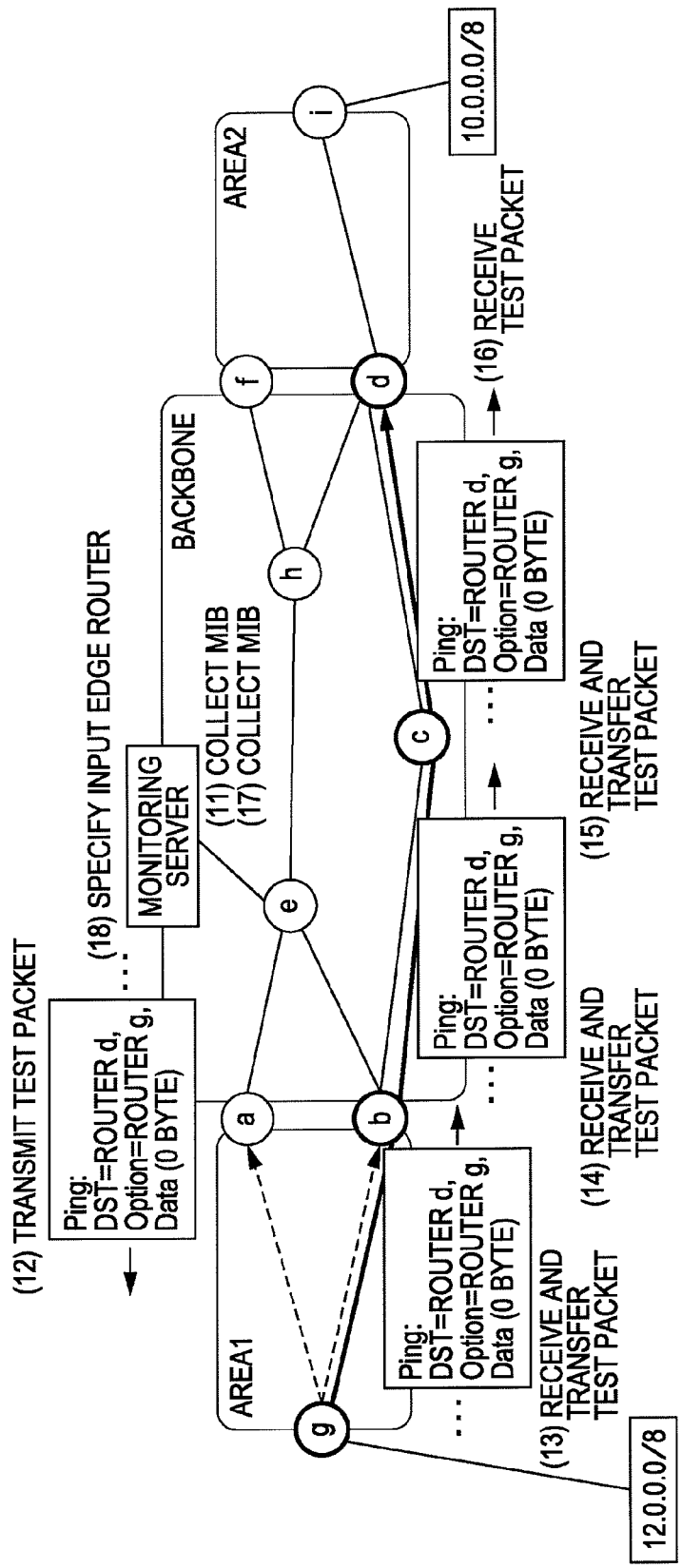
FIG. 16 illustrates an outline of a second embodiment of the invention.

Next, a second embodiment of the invention will be described with reference to FIGS. 16 to 18. The monitoring server transmits the ping packet (SRC: address of the output edge router) to a source router in the above mentioned first embodiment; in the second embodiment, however, it transmits the ping packet to the output edge router through the source router by using a source routing function. The address of the source router is set in an option (Option) field of the IP header as the source routing, hence to instruct the ping packet to pass through the source router.

Hereinafter, an outline of the second embodiment will be described with reference to FIG. 16. Since the network structure is the same as the structure illustrated in FIG. 4, the description thereof is omitted here. At first, the monitoring server collects the Remote Network Monitoring Management Information Base (RMON MIB) information from each of the router a and the router b through the router e and stores the values of the input packet counters included in the RMON MIB information as the first input packet number (FIG. 16: Step (11)). The monitoring server transmits the ping packet (in other words, test packet) to the router d for a predetermined number of times (Step (12)). Here, the monitoring server sets the address of the router g as the source routing in the Option field of the test packet. The size of the data unit of the test packet is 0 byte.

The test packet is destined for the router d; however, the router g is specified as the source routing, and therefore, the router g receives the test packets from the monitoring server one after another and forwards them to the router b (Step (13)).

The router b receives the test packets from the router g one after another and transfers them to the router c (Step (14)). Here, the input packet counter of the router b is counted up by the number of the packets. The router c receives the test packets from the router b one after another and transfers them to the router d (Step (15)). The router d receives the test packets from the router c (Step (16)).

The monitoring server collects the RMON MIB information from each of the router a and the router b through the router e again and stores the values of the input packet counters included in the RMON MIB information as the second input packet number (Step (17)). The monitoring server calculates a difference between the first input packet number and the second input packet number in each of the router a and the router b and specifies the input edge router based on the calculated difference (Step (18)). The input packet counter of the router a and/or the router b with the test packets passing through is counted up by the number of times the test packet is transmitted, and therefore, the router in which the difference between the first input packet number and the second input packet number is approximate to the number of times the test packet is transmitted, is specified as the input edge router. In the example of FIG. 16, the router b is specified as the input edge router.

Next, a specific processing flow of the monitoring server in the second embodiment will be described. Basically, it is the same as the processing flow described in the first embodiment; in the second embodiment, however, instead of the test packet transmission processing (FIG. 10), the processing as illustrated in FIG. 17 (hereinafter, it is referred to as the test packet transmission processing 2) is performed in Step S15 (FIG. 8). The test packet transmission processing 2 will now be described. The functional block diagram of the monitoring server and the router in the second embodiment is the same as that illustrated in FIG. 5.

Figure 17:
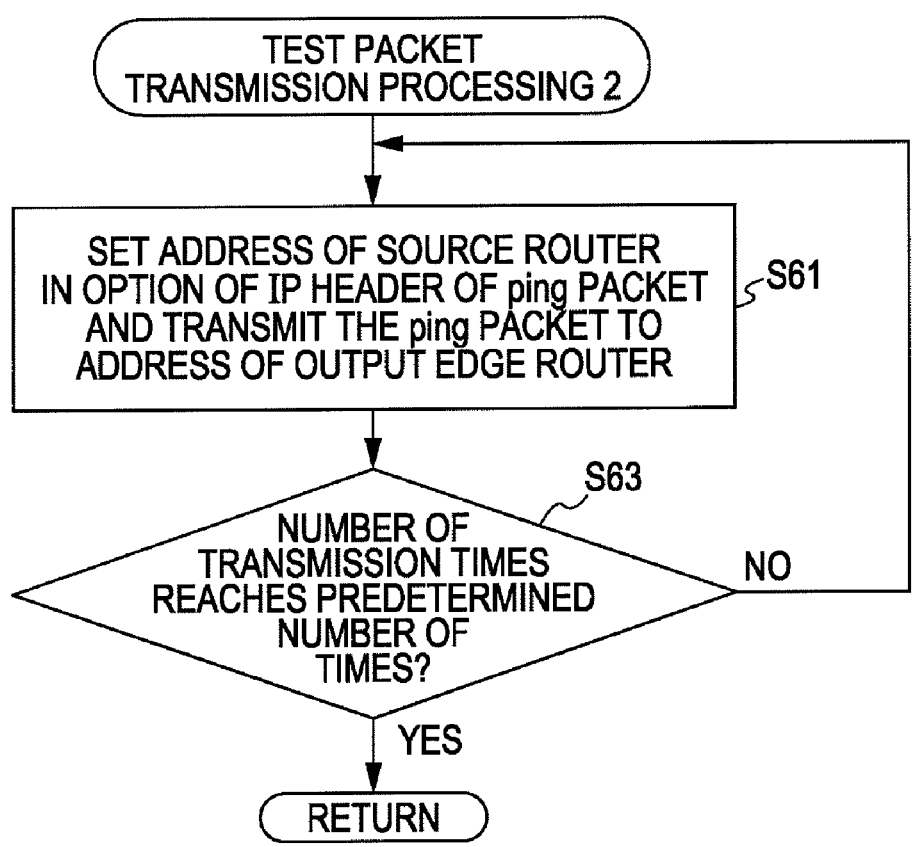
FIG. 17 is a flow chart of a test packet transmission processing 2.
Figure 18:
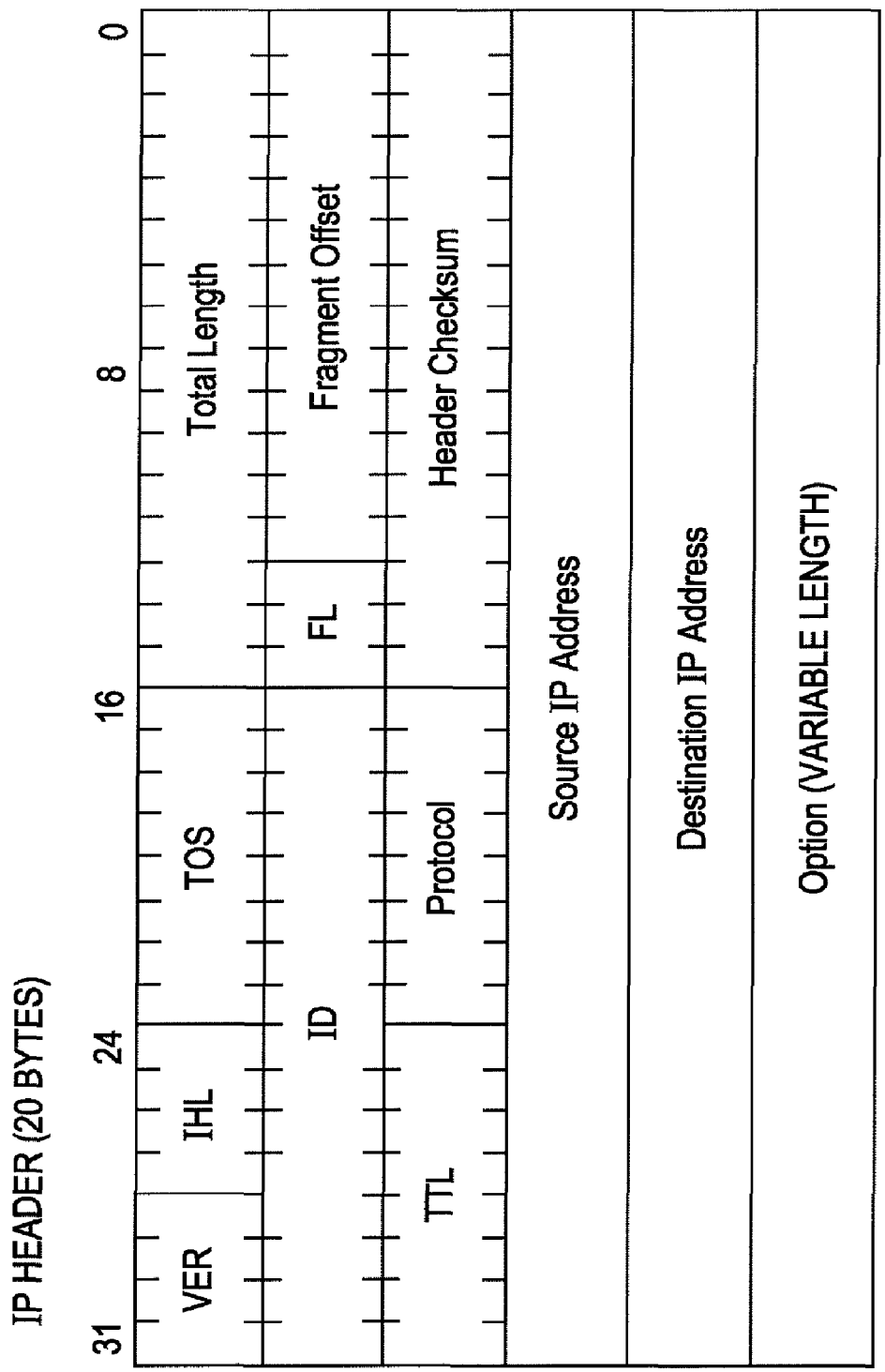
FIG. 18 illustrates the structure of an IP header.

At first, the test packet transmitting unit 14 sets the address of the source router (the router g in FIG. 16) as the source routing in the Option field of the IP header of the ping packet (test packet) to be transmitted and transmits the ping packet to the address of the output edge router (the router d in FIG. 16) (FIG. 17: Step S61). The structure of the IP header is illustrated in FIG. 18.

The test packet transmitting unit 14 checks whether the number of times the ping packet is transmitted reaches the predetermined number of times (Step S63). When it does not reach the predetermined number (Step S63: No route), the processing returns to Step S61, and Step S61 and Step S63 are repeated.

On the other hands, when the number of times the ping packet is transmitted reaches the predetermined number (Step S63: Yes route), the test packet transmission processing 2 is finished, and then the process turns back to the original processing.

Since the address of the transmission source is set as the source routing, the test packet transmitted by the monitoring server reaches the output edge router through the source router. In other words, the above test packet transmission processing 2 enables the source router to transmit the test packet destined to the output edge router. The monitoring server may transmit the test packet, for example, to the destination address selected and entered in Step S7 (FIG. 8), instead of the address of the output edge router.

Therefore, the monitoring server for monitoring a specific area can specify an input edge router of the packets passing through the specific area and also specify a communication path.

The embodiments of the invention have been described hereinbefore; the invention, however, is not limited to this. For example, the functional block diagram of the monitoring server and the router described above may not necessarily correspond to the actual hardware and/or program module structure.

The structure of the respective tables described above is shown as only an example and it is not necessarily limited to the above structure. Further, the sequence of the processing can be changed in the processing flow as long as the processing result is the same. Further, the processing may be performed in parallel.

In the above, the example of using two counters: etherStatsUndersizePkts and etherStatsPkts64Octets is described; however, counters of different size may be used as far as a test packet having a packet size with which the test packet hardly flows through a network, and the counter values before and after transmission of the test packets are compared, so that an input edge router can be specified.

The above-described embodiments of the invention are summarized as follows.

This method of specifying an input edge router is a method performed by a computer for monitoring a specified area in a network divided into a plurality of areas, including: a first obtaining step of obtaining a value of an input packet counter from each of input candidate edge routers that are possible edge routers to receive a specified packet which is transmitted from a specified source address to a specified destination address, passing through a specified area, from a router within an adjacent area, of the edge routers set in a boundary between the specified area and the respective adjacent areas adjacent to the specified area and of storing the values in a storing unit as a first input packet number; a test packet transmitting step of transmitting a test packet having a destination address of an output edge router that is an edge router which supplies the specified packet externally out of the specified area, of the edge routers set in the boundary, or a test packet having the specified destination address, to a source router connected to a network indicated by the specified source address, of the routers within the adjacent areas, for a predetermined number of times; a second obtaining step of obtaining a value of the input packet counter from each of the input candidate edge routers and storing the values in the storing unit as a second input packet number; and a specifying step of calculating a difference between the first input packet number and the second input packet number stored in the storing unit in every input candidate edge router and specifying an input edge router through which the specified packet is supposed to pass, from the input candidate edge routers, according to the calculated difference.

According to this, the computer for monitoring a specified area (for example, a monitoring server) can specify an input edge router from the plurality of the input candidate edge routers. When the input edge router is specified, a communication path within the specified area can be specified, for example, with reference to the routing table.

The specified source address or the specified destination address may be a network address for specifying a subnet. When a plurality of the input edge routers is specified in the above-mentioned specifying step, it may further include a step of performing the steps after the first obtaining step with an address of a specified terminal within a subnet specified by the specified source address or a subnet specified by the specified destination address set as the specified source address or the specified destination address. According to this, it is possible to check a communication path between the respective terminals depending on necessity, after checking a communication path between the subnets.

The test packet transmission step may further include a step of transmitting the test packet having a packet size of 64 bytes or less. The above-mentioned first obtaining step and second obtaining step may include a step of obtaining a value of a counter about the packet having the packet size of 64 bytes or less as the value of the input packet counter. The usual packet flowing on the network has a packet size of more than 64 bytes and according to the above, the test packet can be distinguished from the usual packet, thereby specifying the input edge router more correctly.

The test packet transmission step may include a step of generating a Packet InterNet Groper (ping) packet with the address of the output edge router or the specified destination address set as a transmission source and transmitting the ping packet to the address of the source router. According to this, the reply packet corresponding to the ping packet is transmitted from the source router to the address of the output edge router or the specified destination address. Namely, it is possible to transmit the reply packet as the test packet to the address of the output edge router or the specified destination address.

The above-mentioned test packet transmission step may include a step of generating the test packet including the address of the source router as a source routing and transmitting the test packet to the address of the output edge router or the specified destination address. According to this, the test packet is to pass through the source router. Namely, it is possible to transmit the test packet to the address of the output edge router or the specified destination address.

Further, it is possible to create a program for realizing the monitoring server together with the hardware and the program is stored in a storing medium or a storing unit such as flexible disk, CD-ROM, optical magnetic disk, semiconductor memory, and hard disk. The intermediate processing results are temporarily stored in the storing unit such as a main memory.

Figure 19:
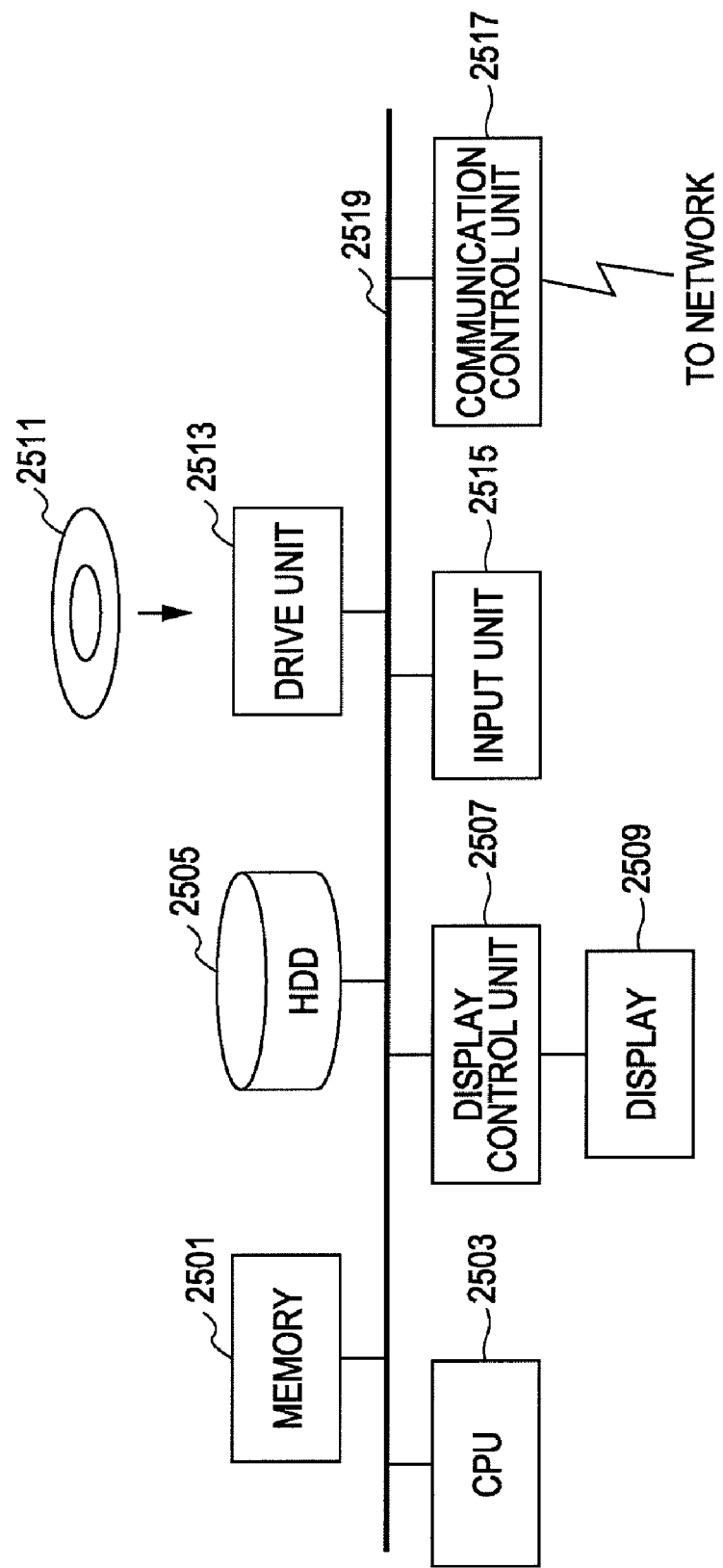
FIG. 19 is a functional block diagram of a computer.

The monitoring server has a memory 2501 (a storing unit), a CPU 2503 (a processing unit), a hard disk drive (HDD) 2505, a display control unit 2507 connected to a display 2509, a drive unit 2513 for a removable disk 2511, an input unit 2515, and a communication control unit 2517 for gaining access to a network which are mutually connected through a bus 2519, as illustrated in FIG. 19. The OS and the application program including the Web browser are stored in the HDD 2505 and they are read out from the HDD 2505 into the memory 2501 when they are executed by the CPU 2503. Depending on necessity, the CPU 2503 controls the display control unit 2507, the communication control unit 2517, and the drive unit 2513 to perform necessary operations. The data under processing is stored in the memory 2501, and if necessary, it is stored in the HDD 2505. This computer realizes the above-mentioned various functions in an organic collaboration with the above mentioned hardware such as the CPU 2503 and the memory 2501, the OS, and the necessary application program.

The embodiments described above are preferred embodiments. The present invention is not limited to this but various modifications can be made without departing from the spirit of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions has been described in detail, it should be understood that the various changes, substitutions, and alterations could be made hereto without departing from the spirit and scope of the invention.

What is claimed is:

1. A program, embodied in a non-transitory, tangible computer-readable storage medium, for causing a computer to monitor a specified area in a network divided in a plurality of areas, said program comprising:
   a first obtaining step of obtaining a value of an input packet counter from each of input candidate edge routers that are possible edge routers to receive a specified packet which is transmitted from a specified source address to a specified destination address, passing through a specified area, from a router within an adjacent area, of edge routers set in a boundary between the specified area and respective adjacent areas adjacent to the specified area, and of storing the values in a storing unit as a first input packet number;
   a test packet transmitting step of transmitting a test packet having a destination address of an output edge router that is an edge router which supplies the specified packet externally out of the specified area or a test packet having the specified destination address, to a source router connected to a network indicated by the specified source address for a predetermined number of times;
   a second obtaining step of obtaining a value of the input packet counter from each of the input candidate edge routers and storing the values in the storing unit as a second input packet number; and
   a specifying step of calculating a difference between the first input packet number and the second input packet number stored in the storing unit in every input candidate edge router and specifying an input edge router through which the specified packet is supposed to pass, from the input candidate edge routers, according to the calculated difference.

2. The program according to claim 1, in which the specified source address or the specified destination address is a network address for specifying a subnet, the program further comprising
a step of performing the first obtaining step, the test packet transmitting step, the second obtaining step, and the specifying step with an address of a specified terminal within a subnet specified by the specified source address or a subnet specified by the specified destination address set as the specified source address or the specified destination address, when a plurality of the input edge routers is specified in the specifying step.

3. The program according to claim 1, in which the test packet transmitting step includes
a step of transmitting the test packet having a packet size of 64 bytes or less, and
the first obtaining step and the second obtaining step include
a step of obtaining a value of a counter about packets having the packet size of 64 bytes or less as the value of the input packet counter.

4. The program according to claim 1, in which the test packet transmitting step includes
a step of generating a Packet InterNet Groper (ping) packet with the address of the output edge router or the specified destination address set as a transmission source and transmitting the ping packet to the source router.

5. The program according to claim 1, in which the test packet transmitting step includes
a step of generating the test packet including an address of the source router as a source routing and transmitting the test packet to the output edge router or the specified destination address.

6. A method of specifying an input edge router performed by a computer for monitoring a specified area in a network divided into a plurality of areas, comprising:
a first obtaining step of obtaining a value of an input packet counter from each of input candidate edge routers that are possible edge routers to receive a specified packet which is transmitted from a specified source address to a specified destination address, passing through the specified area, from a router within an adjacent area, of edge routers set in a boundary between the specified area and respective adjacent areas adjacent to the specified area, and of storing the values in a storing unit as a first input packet number;
a test packet transmitting step of transmitting a test packet having a destination address of an output edge router that is an edge router which supplies the specified packet externally out of the specified area or a test packet having the specified destination address, to a source router connected to a network indicated by the specified source address for a predetermined number of times;
a second obtaining step of obtaining a value of the input packet counter from each of the input candidate edge routers and storing the values in the storing unit as a second input packet number; and
a specifying step of calculating a difference between the first input packet number and the second input packet number stored in the storing unit in every input candidate edge router and specifying an input edge router through which the specified packet is supposed to pass, from the input candidate edge routers, according to the calculated difference.

7. A computer for monitoring a specified area in a network divided into a plurality of areas, comprising:
a test packet transmitting unit which transmits a test packet having a destination address of an output edge router that is an edge router for supplying a specified packet that is transmitted from a specified source address to a specified destination address, passing through a specified area, externally out of the specified area, of edge routers set in a boundary between the specified area and an adjacent area, or a test packet having the specified destination address, to a source router connected to a network indicated by the specified source address for a predetermined number of times;
an input packet number obtaining unit which obtains a first input packet number that is a value of an input packet counter before transmission of the test packet and a second input packet number that is a value of the input packet counter after transmission of the test packet, from each of a number of input candidate edge routers that are possible edge routers to receive the specified packet from a router within the adjacent area, and stores the values in a storing unit; and
an edge router specifying unit which calculates a difference between the first input packet number and the second input packet number stored in the storing unit in every input candidate edge router and specifies an input edge router through which the specified packet is supposed to pass, from the input candidate edge routers, according to the calculated difference.

* * * * *